2,814,617

ACYLATION OF CELLULOSE WITH RETENTION OF FIBER STRUCTURE

Werner Hagenbuch, Basel, and Alfred Rheiner, Binningen, Switzerland, assignors, by mesne assignments, to Saul & Co., Newark, N. J., as nominee of Fidelity Union Trust Company, executive trustee under Sandoz Trust No Drawing. Application February 16, 1953, Serial No. 337,206

Claims priority, application Switzerland February 28, 1952

2 Claims. (Cl. 260—227)

The present invention relates to a process for the acylation of cellulose with retention of the fiber structure, the characteristic feature of the process being that the acylation is carried out with an acylation mixture which contains, as catalyst, a reaction product of sulfuric acid or a salt or derivative thereof with the acylation mixture, which product does not split off a sulfate ion upon addition of water or upon boiling with dilute mineral acid.

Particularly suitable derivatives of sulfuric acid are for example sulfamic acid, acetylsulfuric acid, etc.

The simplest procedure is to prepare the aforesaid reaction product in the ready-to-use acylating mixture, by dissolving the sulfuric acid or the salt or derivative thereof in the said mixture—heating if necessary—and allowing reaction to continue until no more than traces of sulfate ion can be detected upon addition of water or dilute mineral acid to a test specimen and boiling of the latter. The reactions which thus take place are different in character and are not all known, but this does not at all affect the essence of the invention. It is for example possible to isolate sulfoacetic acid and sulfopropionic acid from acetylation or propionylation mixtures, in which sulfuric acid or salts or derivatives thereof were reacted, and to add these sulfocarboxylic acids or acylation products thereof to the acylation mixture according to the present invention with the same success as when using sulfuric acid or salts or derivatives thereof. Accordingly, for the purposes of the present invention, the sulfocarboxylic acids and the reaction products thereof with the acylation mixtures are to be regarded as reaction products resulting from the action of the acylation mixture on sulfuric acid or on a salt or derivative thereof. They are therefore all to be regarded as catalysts for the purposes of the present invention.

Particularly useful acylation mixtures are the acetylation mixtures consisting of mixtures of acetic acid and acetic anhydride.

The use of a low molecular aliphatic sulfocarboxylic acid, especially sulfoacetic acid in the form obtained by the action of an acetylation mixture on sulfuric acid, as a catalyst for the preparation of triacetylcellulose has long been known; see French Patent No. 385,180 (1908). However, this was never of technical significance, since such catalyst is considerably less active than sulfuric acid and thus requires high temperatures, with resultant substantial and troublesome darkening of the acylation mixture. Consequently, sulfoacetic acid has generally been regarded of little value for the preparation of cellulose triesters with dissolution thereof, and accordingly there is hardly any reference thereto in the literature. Moreover, the obtained products are too highly viscous to be able to be worked up directly, which is undesirable and disadvantageous in practice. Therefore, sulfuric acid is today almost exclusively used as catalyst in the preparation of triacetylcellulose solutions.

However, catalysts, as here employed, are not mentioned for the preparation of fibrous esters of cellulose, such as are described for example in British Patent No. 489,928 or U. S. Patent No. 2,253,724.

It has now been found—and this constitutes in part the essence of the present invention—that reaction products of sulfuric acid or derivatives or salts thereof with an acylation mixture, such for example as sulfoacetic acid or its acylation products, behave in quite exceptional manner and, contrary to expectation, favorably as catalysts in the preparation of for example fibrous acetates of low degree of acetylation, whereas sulfuric acid is wholly unsuitable for this purpose. The situation here is thus the very reverse of that in the preparation of for example cellulose triacetate solutions.

Sulfuric acid cannot be used as catalyst in the acylation of cellulose for example to monoacetylated cotton fabric, because it has a swelling and gelatinizing action on the surface of the fiber before the reaction has begun in the interior of the fiber. The result is a non-uniformly esterified product. Reaction products of sulfuric acid or a salt or derivative thereof and an acetylation mixture, on the other hand, are capable of directing the reaction in such manner that the esterification takes place uniformly through the entire fiber. At the same time, only a slight acetolysis and a slight degradation takes place, so that for example monoacetylated threads or paper webs are obtained with substantially undecreased resistance to tearing, as compared with the starting material.

Furthermore, there is no formation, according to the present invention, of a detrimental compound of cellulose with the catalyst, which compound when subsequently heated decomposes with splitting off of acid, as is the case for example in the preparation of cellulose monoacetate in the presence of sulfuric acid as catalyst.

It is therefore necessary that, after the addition of water to a test specimen of the acetylation mixture and boiling of such specimen, no sulfate ions or only a very small quantity thereof be detectable.

While the known salt-like weak catalysts such for example as zinc chloride and the strong catalysts such as perchloric acid have a strong corrosion action even at only slightly raised temperature, it has been found that for example sulfoacetic acid attacks stainless steel and aluminum only very slightly even at 50° C. Persons concerned with construction material problems appreciate the great advantage of having available a substantially non-corrosive catalyst.

Reaction products of sulfuric acid or derivatives thereof with the acylation mixture, for example sulfoacetic acid, have, as catalysts of medium strength, precisely the correct reaction-accelerating action which, in exceptionally favorable manner, renders them suitable for the preparation of fibrous celluloses of a low degree of esterification. The requisite reaction time can be so selected that, in batch operation, the process is completed in several hours, thus making possible not only an exact control but also an economical carrying out of the process. On the other hand, by carrying out the operation as a continuous process, the esterification can be carried out in entirely uniform manner up to for example the monoacetate or diacetate in the course of one or several minutes and at only slightly raised temperatures. This is much more difficult to achieve with strong catalysts, such as perchloric acid, or weak catalysts, such as zinc chloride.

According to a particular embodiment of the present invention, a soluble acid amide or a compound which yields a soluble acid amide in an acylation mixture is added to the latter, whereby the darkening in color which appears when the acylation mixture is used without such an addition, is essentially diminished. Particularly suitable additaments are for example acetamide, diacetamide, propionamide, urea, toluenesulfamide, etc.

The following examples set forth representative exemplary embodiments of the invention, but such examples are intended to be illustrative only and not at all limitative. In these examples the parts and percentages are by weight, and the temperatures are expressed in degrees centigrade.

*Example 1*

1.5 parts of sulfuric acid 100% (monohydrate) are added to 34.5 parts of acetic anhydride (95%) while stirring thoroughly, whereupon the temperature rises to about 60°. Stirring is continued for about 10 more minutes at 70°, until a test specimen of the light amber-colored solution shows no appreciable clouding upon dilution with distilled water and addition of barium chloride solution. After cooling the solution, 24 parts of glacial acetic acid and 90 parts of carbon tetrachloride are added thereto.

10 parts of bucked and bleached cotton yarn (30/2) are pretreated for 1 hour at 40° in 100 parts of 96% acetic acid, then centrifuged down to a dry content of 67–72%, and thereupon treated for 2½ hours at 30° in the acylation mixture prepared according to the first paragraph of this example, the bath being preferably maintained in circulation during such treatment. The yarn is then centrifuged, washed free of acid and carbon tetrachloride with cold and warm water, and dried. The yarn has a bound acetic acid content of 55.0% and, after being heated for 24 hours to 123–127°, has a tear resistance of 745 grams; the tear resistance of the initial material is 700 grams before and 656 grams after heating.

*Example 2*

1.5 parts of sulfuric acid 100% (monohydrate) are stirred into 34.5 parts of acetic anhydride (95%), the temperature being allowed to rise to 60°. Stirring is then continued for 10 minutes at 70° until a test specimen of the resultant acetylation mixture shows no clouding after dilution with distilled water and addition of barium chloride solution. The mixture is then cooled to 30° and 0.90 part of acetamide, 23.1 parts of glacial acetic acid and 90 parts of carbon tetrachloride are stirred in.

10 parts of bucked and bleached cotton yarn (30/2) are pretreated exactly as set forth in Example 1, and then acetylated with the acetamide-containing acetylation mixture of the preceding paragraph under the conditions described in Example 1. The yarn has a bound acetic acid content of 53.4% and, after being heated for 24 hours at 123–127°, has a tear resistance of 720 grams; the initial material has a tear resistance of 700 grams before and 656 grams after such heating.

*Example 3*

1.5 parts of sulfuric acid 100% (monohydrate) are dissolved in 59.5 parts of acetic anhydride, and the solution heated to 65–70° for about 10 minutes. Then 38.1 parts of glacial acetic acid and 0.92 part of urea are added, and stirring continued until the urea is completely dissolved.

Unbleached kraft cellulose (60 grams per square meter, thickness 0.085 mm.) is pretreated for 1 minute at 75° in 96% acetic acid, excess liquid pressed off, and the pretreated cellulose then treated with the urea-containing acetylation mixture of the preceding paragraph. The product is washed free of acid with cold or warm water, and dried. The paper has a bound acetic acid content of 23.2%.

*Example 4*

1.5 parts of sulfuric acid 100% (monohydrate) are dissolved in 57.5 parts of acetic anhydride (95%) and the resultant solution heated for about 10 more minutes at 65–70° until no sulfate ion can be detected. Then 39 parts of glacial acetic acid and 2.05 parts of acetanilide are stirred into the mixture. A strip of unbleached kraft cellulose (60 grams per square meter, thickness 0.085 mm.), pretreated in acetic acid after the manner described in Example 3, is acetylated in the clear acetylation mixture for 1½ minutes at 42°. The paper strip, washed and dried after the manner set forth in Example 3, has a content of bound acetic acid of 23.1%.

*Example 5*

1.5 parts of sulfuric acid 100% (monohydrate) are dissolved in 57.5 parts of acetic anhydride (95%) and the resultant solution heated to 70° for about 10 minutes. To the solution, which is now free of sulfuric acid, there are added 38.4 parts of glacial acetic acid and 2.6 parts of p-toluenesulfonamide.

A sheet of unbleached kraft cellulose (60 grams per square meter, thickness 0.085 mm.), pretreated in 96% acetic acid after the manner set forth in Example 3, is acetylated for 1½ minutes at 40° in the clear acetylation mixture, resulting from the procedure set forth in the preceding paragraph. The resultant paper sheet, further treated according to the procedure set forth in Example 3, has a bound acetic acid content of 30.8%.

*Example 6*

An acetylation mixture is prepared from 8.5 parts of crystalline sulfoacetic acid, 170 parts of acetic anhydride (95%) and 121.5 parts of glacial acetic acid. Paper from unbleached kraft cellulose (60 grams per square meter, thickness 0.085 mm.) is pretreated in 96% acetic acid for 1 minute at 60°, excess liquid squeezed off, and the pretreated paper then acetylated at 40° in the said acetylation mixture. After 80 seconds, the content of bound acetic acid is 26%.

*Example 7*

2000 parts of acetic anhydride (95%) are stirred with 275 parts of technical sulfamic acid at 50°. After about 4–5 hours, reaction sets in with development of heat and, after stirring overnight, the sulfamic acid is completely dissolved. A further 275 parts of sulfamic acid are added, dissolution being complete in about 2 hours, the temperature rising to 60°. A test specimen of the mixture, poured into water, gives a strong precipitate with barium chloride. Stirring is continued at 65° (about 7 hours) until a test specimen, diluted with water and admixed with barium chloride gives no clouding even upon boiling or until 2 mols of acetic anhydride per mol of sulfamic acid have been consumed. To determine the quantity of catalyst in the solution, it is titrated with normal potassium acetate in glacial acetic acid, using methyl violet as the indicator. The dark red stock solution contains 30% catalyst (calculated relative to sulfoacetic acid), and 30% acetic anhydride.

520 parts of acetic anhydride (95%) and 446 parts of glacial acetic acid are added to 34 parts of the said stock solution. 12 parts of the thus-obtained acetylation mixture are then used for acetylating, at 20°, 1 part by weight of cotton yarn (30/2), previously bucked, bleached, pretreated for 10 minutes at 40° in 12 parts of 96% acetic acid, and centrifuged. The temperature is kept at 20° by cooling. After 190 minutes, the yarn is centrifuged, and washed in cold and warm water. The content of combined acetic acid amounts to 28%. The electrical properties of the yarn are good, as is also its reserve upon dyeing with Chloramine Pure Blue FF.

*Example 8*

1 part of cotton yarn (30/2), bucked and bleached, is pretreated in 10 parts of glacial acetic acid for 1 hour at 40°, then centrifuged down to a 40–50% acetic acid content and, at 10°, introduced into 15 parts of a mixture containing 5.7% of catalyst solution (prepared according to Example 7), 25% of acetic anhydride and 55% of carbon tetrachloride, the remainder being acetic acid.

The temperature is brought to 30° within 20 minutes. After 6 hours, the product is centrifuged, washed with water and boiled until the non-solvent is expelled. The yarn contains 61% of combined acetic acid. The strength characteristics are the same as those of the untreated yarn. The electrical properties are very good.

*Example 9*

Paper of unbleached kraft cellulose (60 grams per square meter, thickness 0.085 mm.) is pretreated in 96% acetic acid for 1 minute at 60°, excess liquid squeezed off, and the pretreated material introduced at 42° into a mixture prepared from 1 part of catalyst solution (prepared according to Example 7), 7 parts of acetic anhydride (95%) and 6 parts of acetic acid. After 90 seconds, the paper is withdrawn and washed in water. The content of bound acetic acid is 26%.

*Example 10*

4 parts of dimethyl sulfate, 110 parts of acetic anhydride (95%) and 86 parts of acetic acid are heated to 110° for 1 hour. A test specimen of the mixture, poured into water, gives no clouding with barium chloride. Paper of unbleached kraft cellulose (60 grams per square meter, thicknesses 0.085 mm.) is pretreated in 96% acetic acid for 1 minute at 60°, excess liquid is then pressed off, and the paper acetylated with the afore-prepared acetylation mixture for 80 seconds at 40°. The paper then contains 25% of combined acetic acid.

*Example 11*

18 parts of 2-aminoethyl-sulfuric acid are heated to 115° with 200 parts of acetic anhydride while stirring. The acid dissolves in the course of ¾ hour, 2 mols of acetic anhydride being consumed per mol of acid. The pH is raised by the base present in the solution.

65 parts of the thus-prepared solution are admixed with 210 parts of acetic anhydride (95%) and 225 parts of glacial acetic acid, forming an acetylation mixture. 1 part of bucked and bleached cotton yarn is pretreated in 12 parts of 96% acetic acid at 40° for 10 minutes, then centrifuged, and then introduced at 40° into 20 parts of the said acetylation mixture. After 4¾ hours, the yarn is withdrawn and washed. It contains 29% of bound acetic acid. The electrical properties of the product and its reserve upon being dyed with Chloramine Pure Blue FF are very good.

*Example 12*

185 parts of propionic anhydride (97%) are stirred at 80° with 20 parts of sulfamic acid. The latter is completely dissolved at the end of 5 hours. After another half hour, the reaction mixture is cooled whereupon a precipitate (14 parts) separates out of the dark solution. This precipitate is filtered off; after recrystallization, it is found to consist of pure dipropionamide and has no catalyst properties. The filtrate is used for the preparation of acylation mixtures. It contains 62.4% of propionic anhydride and 15.4% of sulfopropionic acid. A test specimen in water gives no clouding with barium chloride.

*Example 13*

(a) 1.3 parts of cotton yarn (30/2), bucked and bleached, are pretreated in 26 parts of 96% acetic acid for 10 minutes at 40°, centrifuged and, at 20°, introduced into a mixture prepared from 2 parts of the filtrate obtained in Example 12, 13 parts of acetic anhydride (95%) and 11 parts of acetic acid. After 6½ hours, the content of bound acetic acid amounts to 28.3%.

(b) 1.3 parts of cotton yarn are pretreated as in paragraph (a), centrifuged and, at 20°, introduced into a mixture prepared from 2 parts of the filtrate obtained in Example 12, 13 parts of propionic anhydride (95%) and 11 parts of propionic acid. The content of bound propionic acid, after 22 hours, amounts to 29%.

*Example 14*

200 parts of butyric anhydride are heated to 110° with 20 parts of sulfamic acid, while stirring. The acid dissolves, with darkening of color. Upon cooling, only a very slight precipitate separates out and this is filtered off. 1 part of the filtrate is admixed with 2 parts of acetic anhydride (95%) and 2 parts of acetic acid to form an acetylation mixture. Paper of unbleached kraft cellulose is pretreated in 96% acetic acid for 1 minute at 60°, excess liquid expressed, and the paper then acetylated in the said acetylation mixture for 3 minutes at 42°. After washing, the paper contains 25% of bound acetic acid.

Having thus disclosed the invention, what is claimed is:

1. A process for the acylation of cellulose with retention of the fiber structure, which comprises subjecting the cellulose to acylation with an acylation mixture consisting of a lower aliphatic carboxylic acid and an anhydride of such an acid and which contains, as catalyst, the reaction product of one mol of sulfamic acid and two mols of lower aliphatic carboxylic acid anhydride.

2. A process for the acylation of cellulose with retention of the fiber structure, which comprises subjecting the cellulose to acylation with an acylation mixture consisting of a lower aliphatic carboxylic acid and an anhydride of such an acid and which contains, as catalyst, the reaction product of one mol of sulfamic acid and two mols of acetic anhydride.

References Cited in the file of this patent

UNITED STATES PATENTS

| | | |
|---|---|---|
| 2,143,332 | Sindl | Jan. 10, 1939 |
| 2,536,634 | Fraizy | Jan. 2, 1951 |
| 2,589,226 | Carson | Mar. 18, 1952 |
| 2,646,429 | Malm et al. | July 21, 1953 |

OTHER REFERENCES

"The Chemistry of Cellulose" (Heuser), John Wiley & Sons Inc., New York, N. Y., 1947 (page 240 relied on).